Dec. 12, 1939.  S. C. TESMER  2,183,111
SOLARIUM FOR AUTO TRAILERS AND THE LIKE
Filed Oct. 20, 1937  2 Sheets-Sheet 1
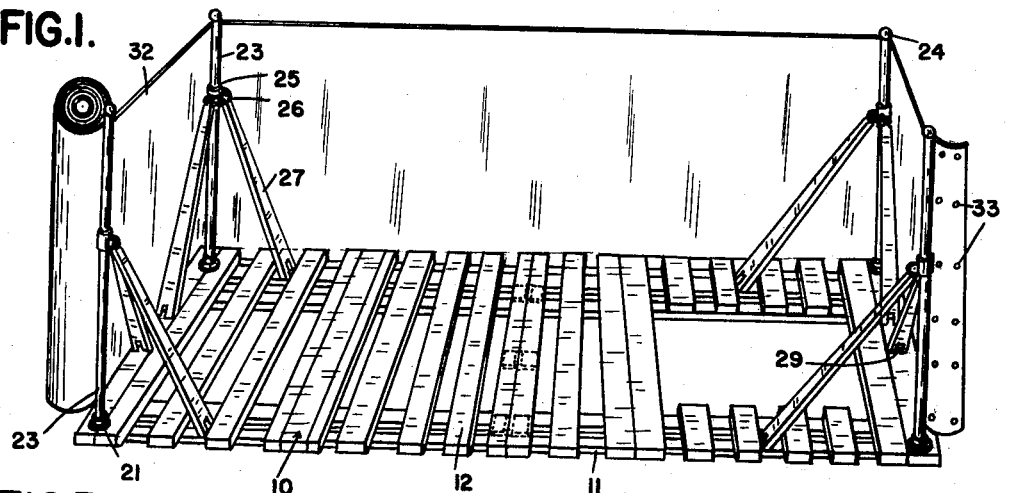
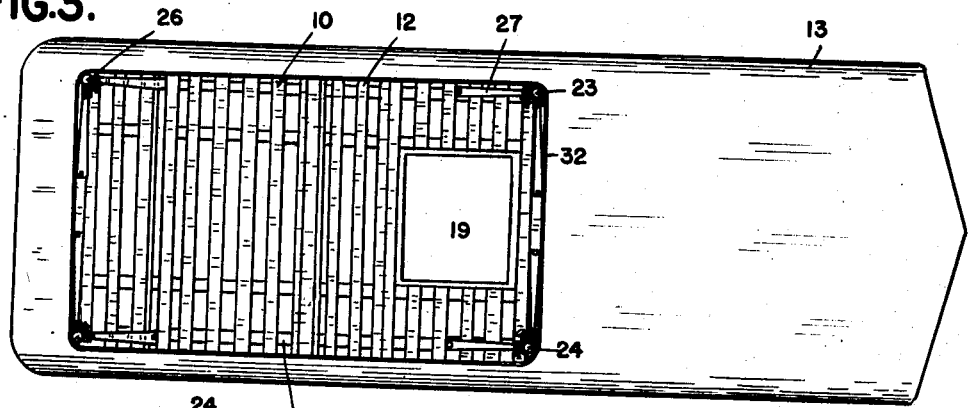
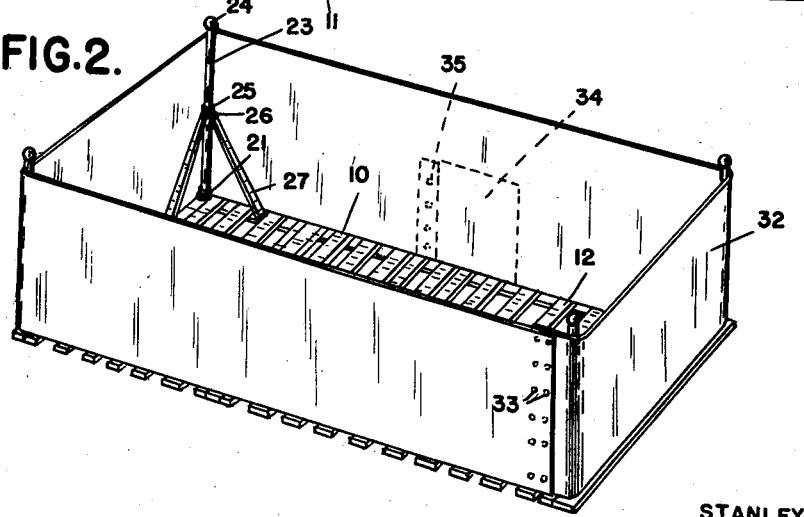
INVENTOR.
STANLEY C. TESMER
BY
ATTORNEYS Dec. 12, 1939.　　　　S. C. TESMER　　　　2,183,111
SOLARIUM FOR AUTO TRAILERS AND THE LIKE
Filed Oct. 20, 1937　　　2 Sheets-Sheet 2
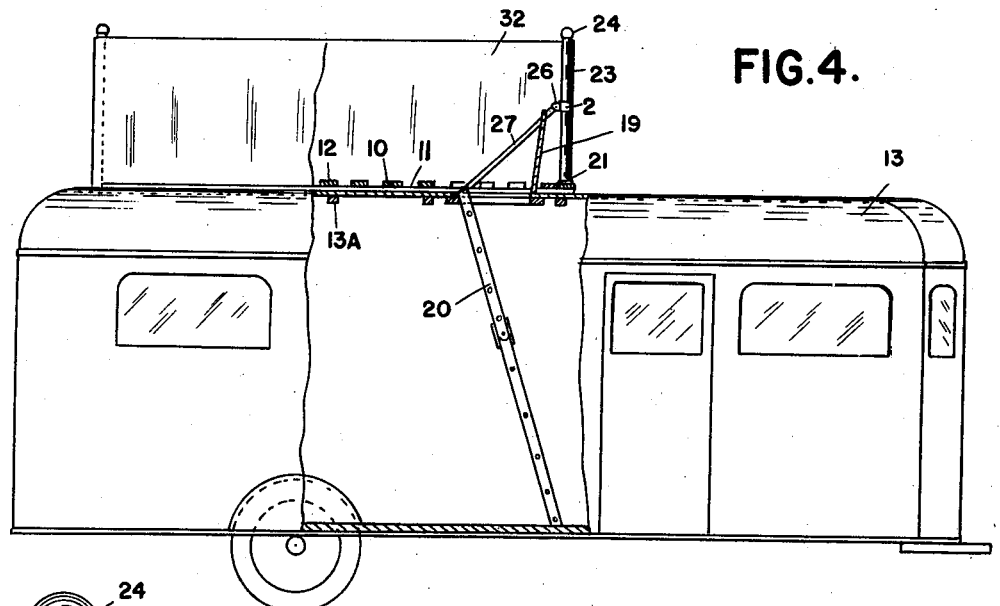
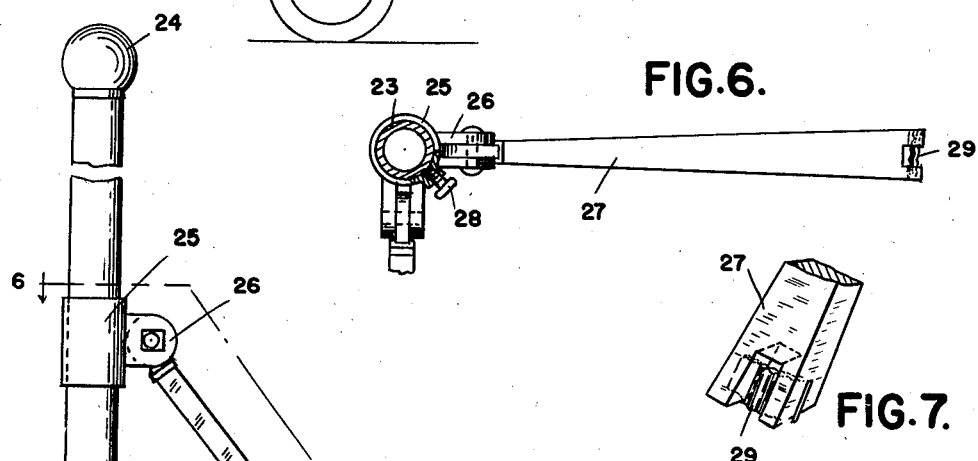
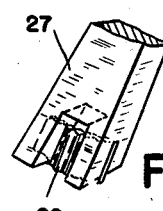
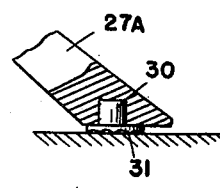
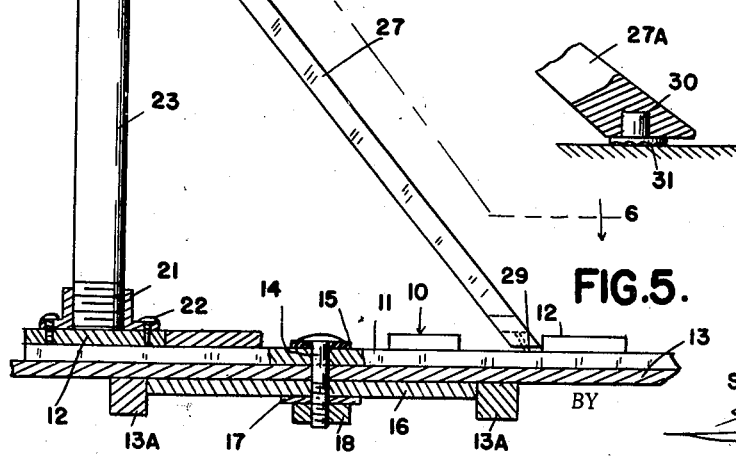
INVENTOR.
STANLEY C. TESMER
BY
ATTORNEYS Patented Dec. 12, 1939

2,183,111

UNITED STATES PATENT OFFICE 2,183,111

SOLARIUM FOR AUTO TRAILERS AND THE LIKE

Stanley C. Tesmer, Berkeley, Mich.

Application October 20, 1937, Serial No. 170,082

6 Claims. (Cl. 128—372)

This invention relates to solaria wherein sun bathers may obtain the desired privacy regardless of the locality where the sun baths are taken.

A primary object of the invention is the arrangement of a solarium on the top of an auto trailer with access to the solarium from the interior of the trailer.

Another object of the invention is the mounting of the solarium floor on a trailer top so as to permit some flexibility or warping of both to accommodate the stresses and strains imparted in travel, use being also made of the flexing qualities of the solarium floor to enable rapid adjustment whenever desired of appropriately positioned posts to draw taut a canvas, or other suitable curtain, enclosing the sides and ends of the solarium.

A further object of the invention is the provision of a floor for a solarium or the like of material having some flexibility, securing sockets for posts directly to such floor, removably mounting posts in such sockets, covering the ends and sides of the solarium exteriorly of the posts with a flexible but opaque screen, and providing a plurality of adjustable braces between each post and the floor whereby adjustment of the braces will swing the posts as desired to hold the screen taut.

Other objects and advantages will be apparent from the following description, wherein reference is made to the accompanying drawings illustrating a preferred embodiment of my invention and wherein similar reference numerals designate similar parts throughout the several views.

In the drawings:

Figure 1 is a perspective view of my improved solarium positioned for use except that the screen at one side has been rolled up.

Figure 2 is a perspective view from a different angle of the solarium with the screen positioned on all sides.

Figure 3 is a plan view of my improved solarium in position for use on the top of an auto trailer.

Figure 4 is a side view of the auto trailer with my improved solarium positioned thereon, parts being broken away centrally of the trailer to show an interior view.

Figure 5 is an enlarged sectional view through the solarium floor and top of the trailer on which it is mounted, one corner post and adjacent brace therefor being shown in elevation.

Figure 6 is a horizontal section taken substantially on the line 6—6 of Figure 5.

Figure 7 is an enlarged perspective view of a brace-foot, showing one means for mounting therein a securing cleat, and Figure 8 is a similar view, with parts in section of another embodiment of securing cleat on the brace-foot.

Referring now to the drawings, reference numeral 10 designates the floor of my improved solarium, which is herein shown as formed of a plurality of longitudinal supports 11 and lateral supports 12. The longitudinal supports 11 are spaced from each other and preferably comprise two pairs of spaced supports adjacent the sides of the solarium for purposes of lightness and convenience in locating them upon the roof of an auto trailer so as to accommodate for weaving of the vehicle during travel. The longitudinal supports may each be of one piece, but preferably they are divided substantially centrally and hinged so that they may be folded into a small area for storage or shipping purposes. In the illustrated embodiment each longitudinal support 11 is bolted at intervals to the top 13 of the auto trailer, Fig. 5 illustrating in section a sample of the bolting arrangement. Bolts 14 extend through aligned apertures in the longitudinal supports 11 and the trailer top 13, with rubber washers 15 clamped between the bolt head and the upper face of each of the longitudinal supports 11. To reenforce the trailer top a wooden insert 16 is preferably arranged below the trailer top 13 between adjacent roof supports 13A, and a wide metallic washer 17 is clamped between such wooden insert and the nut 18 when the nut is turned into securing position. The rubber washer 15 serves both to seal the bolt aperture against ingress of moisture and also to lend flexibility to the mounting of the solarium upon the auto trailer. The lateral supports 12 are secured only to the longitudinal supports 11 by suitable fastening elements, and are also preferably spaced from each other to lighten the floor structure while permitting it to warp or weave with the trailer top.

As best illustrated in Figs. 3 and 4, the solarium is mounted mainly upon the rear half of the auto trailer roof 13, and portions of the lateral supports 12 are removed adjacent one end of the floor to provide for the upward swinging of a trap door 19 herein shown as pivoted adjacent its forward extremity upon the trailer top and normally closing the trap door opening. A folding ladder 20 is arranged to permit persons to pass from within the trailer through the trap door 19 and onto the solarium floor whenever desired, the latter being preferably pivoted or arranged in sections of sufficient size to permit storage in suitable compartments in the trailer when not in use.

Sockets 21 are suitably secured upon the lateral supports 12 adjacent each end of the solarium floor, as by screws 22. These sockets 21 are preferably internally threaded to receive the threaded lower extremities of corner post 23, which may be formed of tubular stock surmounted by an ornate head 24. Each corner post 23 is encircled by a slidable sleeve 25 provided with integral pairs of ears 26 at substantially 90 degrees from each other, as best shown in Fig. 6. Between each pair of ears is pivoted the upper end of a brace 27 whereby the position of the corner posts may be adjusted at will and then maintained in the desired adjusted position, as hereinafter pointed out. The position of the sleeve 25 on each corner post may also be adjusted at will, and then held in the desired adjusted position by means of a set screw 28. The lower extremity of each brace 27 carries a metallic cleat 29 adapted to engage the upper surface of either a longitudinal or lateral floor support. As shown in Figs. 5, 6 and 7 a preferred method of mounting such cleat 29 consists of driving a corrugated metallic member having teeth at its opposite edges into tines at the lower extremity of each brace 27 until only the lower teeth of the cleat project beyond the bottom of the brace. The cut-out portion between the tines permit for the insertion of a suitable tool for adjusting the position of such cleat if needed. In Fig. 8 is shown an alternative form of cleat, the lower extremity 27A of the brace member being beveled and in its beveled face is mounted the shank 30 of a cast or forged metallic cleat 31 which is provided with suitable teeth on its lower face for engagement with the surface of the floor supports.

The sides and ends of my improved solarium are enclosed by means of an opaque screen 32 of flexible screen 32, such as canvas or the like. This screen 32 is of a height sufficient to reach from the floor to just under the ornate heads 24 of the corner posts, and I prefer to secure the ends of the screen to each other by sewing or removable fastening members 33, such as snap buttons or the like, whereby the screen will be in effect an endless ring when it is being used. In use, after the corner posts 23 are mounted in the sockets 21, and before the posts are adjusted into final position, the canvas screen 32 is arranged exteriorly of the four posts by dropping the screen outside one post at a time, the size of the screen having been previously arranged so as to loosely fit exteriorly of the four posts 23. The posts are then swung outwardly to draw the canvas screen taut by moving the braces 27. To secure this adjustment of the posts, the sleeves 25 are slid to suitable positions along the posts and then held there by tightening the set screws 28, after which the lower extremities of each brace 27 is moved toward the bottom of its attached post and then forced into engagement with the floor supports at the desired positions. Such movement of the braces 27 will serve to swing the upper extremities of the posts 23 outwardly and so to draw taut the canvas screen 32. Since the lateral floor supports are preferably made of wood or other flexible material capable of being warped under strain, the desired swinging of the corner posts may be secured by warping the floor boards in the necessary directions. This manner of mounting the canvas screen serves to maintain it taut as long as the brace cleats are in firm engagement with the floor supports. When, however, it is desired to remove the screen, it is only necessary to raise the lower extremities of each brace cleat from its position so as to relieve the strains serving to warp the floor boards, whereupon the corner posts 23 swing inward sufficiently to loosen the canvas screen 32, which can then be slipped over the tops of the posts and folded into position for storage in a suitable compartment in the trailer. The posts, with their attached sleeves 25 and braces 27 can then be unscrewed from the sockets 21 and similarly stored in a trailer compartment. The floor members and the sockets 21 preferably remain in position upon the trailer top.

It will be apparent that my improved solarium may also be used in other positions than on the tops of auto trailers, as, for example, upon a porch or roof of a building. With such an arrangement it may not be accessible to enter the solarium through the trap door 19, and I accordingly provide means of ingress through the canvas screen. As shown in dotted lines in Fig. 2, such an opening is provided by means of a flap 34, of similar material as the screen, covering an entrance and exit opening, suitable fastening elements 35 as, for example, snap buttons being arranged to secure the flap 34 in position while privacy is desired.

From the foregoing it will be seen that I have provided a light but strong solarium adapted for ready mounting upon the roofs of auto trailers or other suitable places. The solarium floor may be solidly bolted into place on the trailer top without interfering with the weaving and other motions of the trailer during travel, nor offering much wind resistance. The posts and screen portions of the solarium may be quickly arranged into position for use and as quickly removed from the solarium floor. The canvas screen may be maintained taut as long as desired and means for drawing it taut and again loosening it prior to removal are very simple and easy to operate.

While it will be apparent that the illustrated embodiment of my invention herein disclosed is well calculated to adequately fulfill the objects and advantages primarily stated, it is to be understood that the invention is susceptible to variation, modification and change within the spirit and scope of the subjoined claims.

What I claim is:

1. In combination with an auto trailer having a roof, a solarium comprising a floor structure secured upon the trailer roof and of sufficient stiffness to distribute weight stresses throughout a relatively wide area of the roof, a detachable, flexible opaque screen upstanding from the ends and sides of an enclosed area of the roof to define an open-topped solarium, bracing means engageable with the floor and assisting in the support of said screen, said floor being sufficiently flexible to be somewhat distorted by said bracing means and to impose continuous pressure upon said screen through said bracing means, whereby to maintain the screen taut.

2. A solarium comprising a floor structure, sockets secured to the floor structure adjacent the corners, posts detachably securable to the floor structure in spaced upstanding relation to define the corners of an enclosure, said posts being fixed at their lower ends but swingable outwardly thereabout, an opaque screen of limp material arranged to extend around such area and to contact the outer portions of and be supported by the posts, and braces pivotally secured to the posts and freely swingable relatively thereto, said braces having gripping foot portions engageable with the floor structure at any of a plurality of points therealong, whereby the posts may be swung outwardly and held by the braces to stretch the screen.

3. Means as set forth in claim 2 in which the floor structure is flexible, the posts being rigidly attachable at their lower ends thereto, and the floor being flexed by such outward swinging movement of the posts.

4. Means as set forth in claim 2, in which the braces are adjustably mounted at their upper extremities on the posts and securable thereto at any of a plurality of positions.

5. Means as set forth in claim 2 including a plurality of braces for each post, a sleeve slidable along each post, the braces being pivotally connected at their upper extremities to the sleeve, and means for fixing the sleeves to the posts at any of a plurality of positions.

6. Means as set forth in claim 2 in which said floor structure comprises spaced wooden elements, said gripping foot portions having teeth adapted to penetrate the wood to hold the braces when engaged with the top surface of one of said wooden elements, certain of said braces also being engageable between said spaced wooden elements whereby the latter may act to block unwanted movement of the posts.

STANLEY C. TESMER.